US008270480B2

United States Patent
Yin et al.

(10) Patent No.: US 8,270,480 B2
(45) Date of Patent: Sep. 18, 2012

(54) METHOD AND APPARATUS FOR RAPID VIDEO AND FIELD CODING

(75) Inventors: Peng Yin, West Windsor, NJ (US); Jill MacDonald Boyce, Manalapan, NJ (US); Alexandros Michael Tourapis, Yorba Linda, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 1592 days.

(21) Appl. No.: 11/662,435

(22) PCT Filed: Sep. 14, 2005

(86) PCT No.: PCT/US2005/032732
§ 371 (c)(1),
(2), (4) Date: Mar. 9, 2007

(87) PCT Pub. No.: WO2006/033915
PCT Pub. Date: Mar. 30, 2006

(65) Prior Publication Data
US 2008/0101471 A1    May 1, 2008

Related U.S. Application Data
(60) Provisional application No. 60/610,512, filed on Sep. 16, 2004.

(51) Int. Cl.
*H04N 7/12* (2006.01)
(52) U.S. Cl. ......... 375/240.12; 375/240.16; 375/240.24; 375/240.01; 375/240.14

(58) Field of Classification Search ............. 375/240.16, 375/240.14, 240.24–26; 382/233, 235–236, 382/238
See application file for complete search history.

(56) References Cited

U.S. PATENT DOCUMENTS

| 5,168,357 | A | | 12/1992 | Kutka |
| 5,227,878 | A | * | 7/1993 | Puri et al. ............... 375/240.15 |
| 5,434,622 | A | | 7/1995 | Lim |
| 5,617,143 | A | | 4/1997 | Shimokoriyama et al. |

(Continued)

FOREIGN PATENT DOCUMENTS
EP    0 796 017 A2    9/1997
(Continued)

OTHER PUBLICATIONS

Callico, G. ,Analysis of fast block matching motion estimation algorithms for video super-resolution systems ,Inst. of Appl. Microelectron., Univ. of Las Palmas de Gran, vol. 54, Issue: 3;On pp. 1430-1438; Date of Publication: Aug. 2008.*

(Continued)

*Primary Examiner* — Taghi Arani
*Assistant Examiner* — Angela Holmes
(74) *Attorney, Agent, or Firm* — Robert D. Shedd; Paul P. Kiel; Guy H. Eriksen

(57) ABSTRACT

There are provided video encoders and corresponding methods for encoding video data for an image that is divisible into super-macroblocks (super-MBs). A video encoder includes an encoder for classifying a super-MB in the image with respect to one of a frame mode or a field mode using a band-pass/high-pass filter applied vertically to the image.

25 Claims, 4 Drawing Sheets

U.S. PATENT DOCUMENTS

| | | | |
|---|---|---|---|
| 5,737,020 A | | 4/1998 | Hall et al. |
| 5,790,195 A | * | 8/1998 | Ohsawa ............... 348/419.1 |
| 5,874,996 A | | 2/1999 | Shimokoriyama et al. |
| 6,275,533 B1 | | 8/2001 | Nishi |
| 6,466,621 B1 | | 10/2002 | Cougnard et al. |
| 6,577,680 B2 | * | 6/2003 | Wake et al. ............ 375/240.14 |
| 6,980,596 B2 | * | 12/2005 | Wang et al. ............ 375/240.16 |
| 6,996,278 B2 | * | 2/2006 | Ohyama et al. ............ 382/232 |
| 2004/0120397 A1 | | 6/2004 | Zhang et al. |
| 2004/0120398 A1 | | 6/2004 | Zhang et al. |
| 2004/0246373 A1 | | 12/2004 | Kadono et al. |
| 2004/0264571 A1 | | 12/2004 | Zhang et al. |

FOREIGN PATENT DOCUMENTS

| | | |
|---|---|---|
| FR | 2 699 306 A | 6/1994 |
| JP | 4-108285 | 4/1992 |
| JP | 6-284399 | 10/1994 |
| JP | 2004-187107 | 7/2004 |

OTHER PUBLICATIONS

Activity Recognition Using Motion Features and Multi-Sensor Input by Liu, Hao-Wei, Ph.D., University of Washington, 2011, 134 pages; AAT 3485518.*

List, Peter et al., "Adaptive Deblocking Filter", IEEE Transactions on Circuits and Systems for Video Technology, vol. 13, No. 7, Jul. 2003, pp. 614-619.

Guoping Li, Yun He, An Adaptive Macroblock Group Coding Algorithm for Progressive and Interlaced Video, State Key Lab on Micromave and Digital Communications, Dept. of Electronic Engineering, Tsinghua University, Beijing, China, pp. 969-972, 2004.

Wiegand, Gary J. Sullivan, "Overview of the H.264/AVC Video Coding Standard", IEEE Transactions on Circuits and Systems for Video Technology, vol. 13, No. 7, Jul. 2003.

European Search Report, Mar. 9, 2007.

* cited by examiner

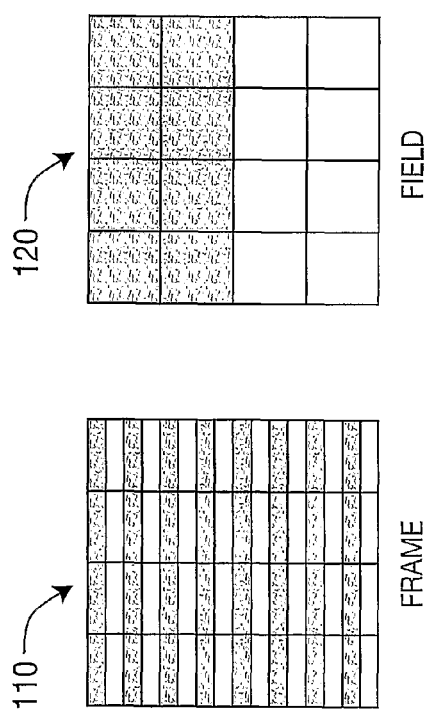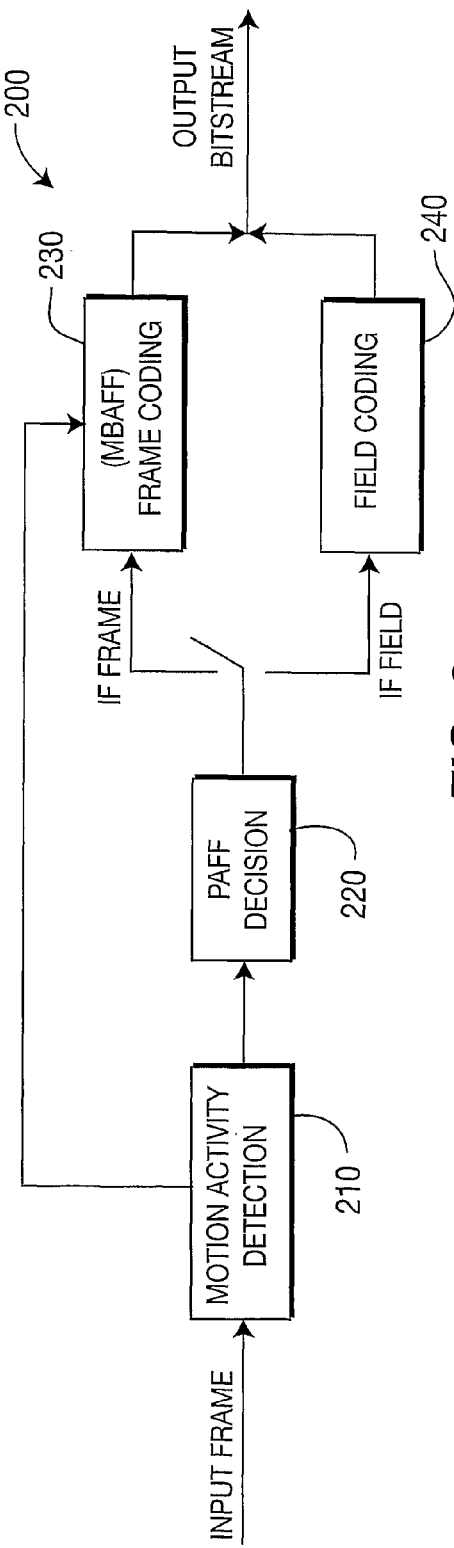

METHOD AND APPARATUS FOR RAPID VIDEO AND FIELD CODING

CROSS-REFERENCE TO RELATED APPLICATIONS

This application claims the benefit, under 35 U.S.C. §365 of International Application PCT/US2005/032732, filed Sep. 14, 2005 which was published in accordance with PCT Article 21(2) on Mar. 30, 2006 in English and which claims the benefit of U.S. provisional patent application No. 60/610,512 filed Sep. 16, 2004.

FIELD OF THE INVENTION

The present invention relates generally to video encoders and, more particularly, to a method and apparatus for rapid video frame and field coding.

BACKGROUND OF THE INVENTION

The JVT/H.264/MPEG AVC ("JVT") standard allows the encoding of both progressive and interlaced video sequences, and supports three different picture coding modes. Turning to FIGS. 1A through 1C, picture coding types within H.264 are generally indicated by the reference numerals 110, 120, and 130. In particular, a frame coding type is generally indicated by the reference numeral 110, a field coding type is generally indicated by the reference numeral 120, and an macroblock (MB) adaptive frame/field coding type is generally indicated by the reference numeral 130.

In frame-based coding 110, a picture is created by interleaving both top and bottom lines. In field-based coding 120, an interlaced frame is separated into top and bottom fields, and each field is coded separately. The standard also supports the secondary frame mode referred to as Macroblock Adaptive Frame/Field coding (MBAFF) mode, where the frame is partitioned in 16×32 Super-Macroblocks. These partitions essentially include 2 macroblocks (MBs) that are both coded in either field or frame mode. It is also possible to combine either one of the two frame picture coding modes (normal or MBAFF) with field pictures, which provides additional flexibility and improved performance at the encoder. This, nevertheless, requires that the encoder have the capability to adaptively select which picture coding mode is to be used (Picture Adaptive Frame/Field Coding—PAFF).

In general, for interlaced frames with rapid motion, it may be more efficient to compress each field separately. On the other hand, if a frame includes both moving regions and static regions, then it is usually more efficient to code the moving region in field mode and static regions in frame mode using MBAFF coding.

The picture level frame and field coding (PAFF) and macroblock level frame and field coding (MBAFF) tools were adopted by the H.264 video coding standard into the Main and Extended profiles for improving coding efficiency for interlaced sequences. PAFF decision is used to decide whether or not the current interlaced frame, which includes two complementary fields, should be coded as a single frame (frame mode), or as two separately coded fields (field mode). MBAFF decision, on the other hand, is used within a special structured frame mode that includes 16×32 Super-Macroblocks (Super-MBs), i.e., a pair of vertically adjacent macroblocks, to decide whether a Super-MB is to be coded in field mode or frame mode.

Hence, multiple combinations for coding an interlaced sequence are possible. More specifically, each frame may be coded as either a single non-interlaced frame without Super-MB partitioning or as two complementary fields (PAFF mode). A second option is to code the entire sequence in MBAFF mode, where each frame is coded as a single frame which includes a frame of field Super-MB partitions (MBAFF mode). Finally, it is possible to also combine the above two decisions, where a frame can be either coded as a single frame comprised of frame or field Super-MB partitions or as two complementary fields (PAFF+MBAFF).

In the JVT reference software, a multi-pass approach is used to decide the coding mode. If PAFF is used, then a frame will be first coded in both frame and field mode. The final mode will be selected as the one that leads to the smallest Lagrangian distortion $J=D+\lambda R$, where D is distortion, R is the rate, and $\lambda$ is the Lagrange multiplier. Similarly, if MBAFF is used, then each Super-MB partition (i.e. a group of 2 vertically adjacent MBs), will be first coded in both frame and field mode. The final mode for this Super-MB is again selected as the one with the smallest Lagrangian distortion. Finally, if PAFF+MBAFF are both considered, then the encoding process can be seen as a combination of the above PAFF and MBAFF coding methods, that is, the frame is first coded in frame mode using MBAFF, where each Super-MB will be coded in either field or frame mode based on the previously described MBAFF decision. The same frame will also be coded as two separate fields, and the final coding mode (MBAFF frame vs. Field) will be decided based on the PAFF decision.

The adoption of these tools provides more flexibility for coding interlaced sequences, although, on the other hand, considerably increases complexity.

Accordingly, it would be desirable and highly advantageous to have a method and apparatus for fast and/or lower complexity PAFF and MBAFF decision.

SUMMARY OF THE INVENTION

These and other drawbacks and disadvantages of the prior art are addressed by the present invention, which is directed to a method and apparatus for rapid video frame and field coding.

According to an aspect of the present invention, there is provided a video encoder for encoding video data for an image that is divisible into super-macroblocks (super-MBs). The video encoder includes an encoder for classifying a super-MB in the image with respect to one of a frame mode or a field mode using a band-pass/high-pass filter applied vertically to the image.

According to another aspect of the present invention, there is provided a video encoder for encoding video data for an image that is divisible into super-macroblocks (super-MBs). The video encoder includes an encoder for performing a picture adaptive frame field (PAFF) decision using a band-pass/high-pass filter applied vertically to each of the super-MBs to respectively classify each of the super-MBs as a moving region or a non-moving region in the image. The PAFF decision is based on a percentage of super-MBs classified as moving regions in the image.

According to yet another aspect of the present invention, there is provided a video encoder for encoding video data for an image that is divisible into super-macroblocks (super-MBs). The video encoder includes an encoder for utilizing a pre-analysis decision of whether to classify an individual super-MB in the image with respect to a field mode or a frame mode, for both a picture adaptive frame field (PAFF) mode selection and a macroblock adaptive frame field (MBAFF) mode selection.

According to still another aspect of the present invention, there is provided a method for encoding video data for an image. The method includes the step of classifying a super-macroblock (super-MB) in the image with respect to one of a frame mode or a field mode using a band-pass/high-pass filter applied vertically to the image.

According to a further aspect of the present invention, there is provided a method for encoding video data for an image that is divisible into super-macroblocks (super-MBs). The method includes the step of performing a picture adaptive frame field (PAFF) decision using a band-pass/high-pass filter applied vertically to the super-MBs to respectively classify each of the super-MBs as a moving region or a non-moving region in the image. The PAFF decision is based on a percentage of super-MBs classified as moving regions in the image.

According to an additional aspect of the present invention, there is provided a method for encoding video data for an image. The method includes the step of utilizing a pre-analysis decision whether to classify an individual super-macroblock (super-MB) in the image with respect to a field mode or a frame mode for both a picture adaptive frame field (PAFF) mode selection and a macroblock adaptive frame field (MBAFF) mode selection.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which:

FIGS. 1A-1C are diagrams illustrating picture coding types within H.264 and as applicable for use in accordance with the principles of the present invention;

FIG. 2 shows a block diagram for a video encoder with fast picture frame and field coding (PAFF) or PAFF and macroblock frame field coding (MBAFF) decision in accordance with the principles of the present invention;

DETAILED DESCRIPTION

Figure 3:
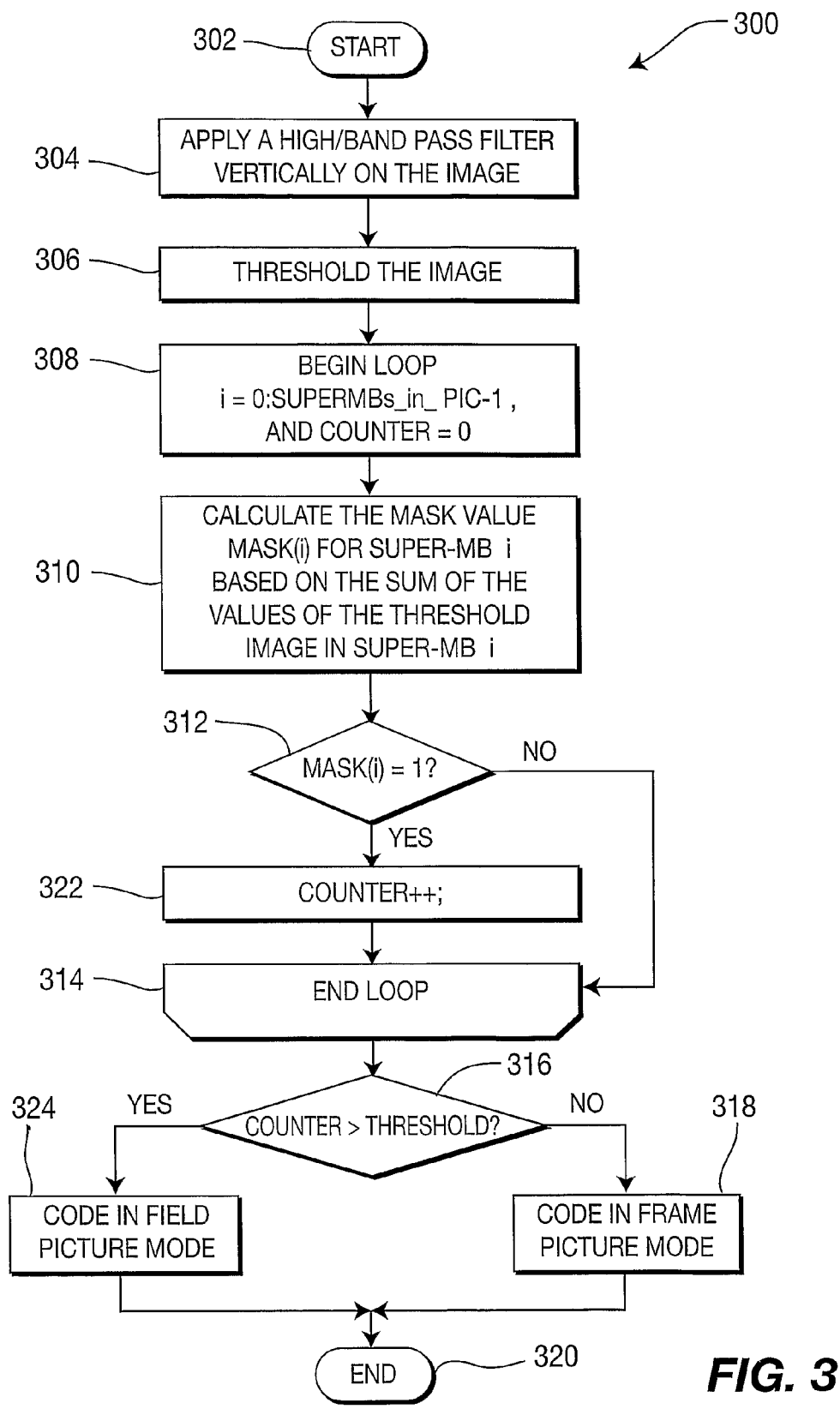
FIG. 3 shows a flow diagram for a method for performing a fast picture frame and field coding (PAFF) decision in accordance with the principles of the present invention.

The present invention is directed to a method and apparatus for rapid video frame and field coding. The method and apparatus may be performed in a pre-analysis stage.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

A general description of the present invention will now be given, followed by more detailed descriptions of various aspects thereof.

Turning to FIG. 2, a video encoder with fast picture frame and field coding (PAFF) or PAFF and macroblock frame field coding (MBAFF) decision is indicated generally by the reference numeral 200.

An input to the video encoder 200 is connected in signal communication with an input of a motion activity detector 210. A first output of the motion activity detector 210 is connected in signal communication with a first input of a frame mode or MBAFF frame mode coder 230 and with an input of a PAFF decision module 220. An output of the PAFF decision module 220 is capable of being connected in signal communication with a second input of the frame mode or MBAFF frame mode coder 230 and with a first input of a field mode coder 240, depending on an output of the PAFF decision module 220. An output of the frame mode or MBAFF frame mode coder 230 or an output of the field mode coder 240 is available as an output of the video encoder 200.

In one illustrative embodiment of the present invention, a band-pass/high-pass filter is applied on the image to detect moving regions in the image. A PAFF decision is performed based on the percentage of Super-MBs classified as moving regions within the image. Similarly, MBAFF decision is performed based on whether the corresponding Super-MB is also classified as corresponding to a moving region. During detection of the moving edge, an adaptive threshold is applied.

A basic presumption implicit in an embodiment of our invention is that, in general, moving regions are usually best coded using field coding while static regions are instead better coded in frame mode.

A further description of the above embodiment of the present invention will now be given. The present invention may be considered to include the following three steps.

The first step involves applying the band-pass/high-pass filter on the image to detect moving regions in the image. The band-pass/high-pass filter detects the moving regions in the image by, e.g., considering the impact of such a filter on the interlace artifacts (moving edge) within the image. The band-pass/high-pass filter may be, but is not limited to, a filter used for edge detection, an edge detector, and/or any other element capable of detecting a moving region in an image or portion thereof. Preferably, but not necessarily, the band-pass/high-pass filter is applied vertically on the image.

The second step involves creating a mask for each Super-MB. The mask is set to 1 if the Super-MB is a moving Super-MB, and to 0 if the Super-MB is not a moving Super-MB, based on the values of the filtered pixels of the Super-MB.

The third step can be considered to include 2 parts (or sub-steps) that may be performed independently (i.e., only one is performed) or in combination (i.e., both are performed).

The first part of the third step is performed when PAFF decision is to be used. In such a case, the number of moving Super-MBs is also counted and, when the percentage is larger than a threshold $T_1$, the frame is coded in field mode. Otherwise, the frame is coded in frame mode.

The second part of the third step is performed when MBAFF decision is to be used. In such a case, when the mask for the current Super-MB is equal to one, then the current Super-MB is coded in field mode. Otherwise, the current Super-MB is coded in frame mode.

As noted above, the first part and the second part of the third step can be combined for two-step PAFF+MBAFF decision, where PAFF decision is made first, and if frame is selected by the PAFF decision, then MBAFF decision is made.

Turning to FIG. 3, a method for performing a fast picture frame and field coding (PAFF) decision is generally indicated by the reference numeral 300. The method 300 includes a start block 302 that passes control to a function block 304. The function block 304 applies a high/band pass filter vertically on the image, and passes control to a function block 306. The function block 306 applies a threshold to the image, and passes control to a loop limit block 308. The loop limit block 308 begins a loop, loops variable i from 0 to superMBs_in_pic-1, and passes control to a function block 310. The function block 310 calculates the mask value MASK(i) for super-MB i based on the sum of the values of the threshold image in super-MB i, and passes control to a decision block 312. The decision block 312 determines whether or not the mask value MASK(i) is equal to 1. If the mask value MASK(i) is not equal to 1, then control is passed to a loop limit block 314. Otherwise, if the mask value MASK(i) is equal to 1, then control is passed to a function block 322.

The end loop block 314 ends the loop, and passes control to a decision block 316. The decision block 316 determines whether or not the counter variable is greater than a pre-specified threshold. If the counter variable is not greater than a pre-specified threshold, then control is passed to a function bock 318. Otherwise, if the counter variable is greater than a pre-specified threshold, then control is passed to a function block 324.

The function bock 318 performs coding in frame picture mode, and passes control to an end block 320.

The function block 322 increments the counter by 1, and passes control to loop limit block 314.

The function block 324 performs coding in field picture mode, and passes control to end block 320.

Figure 4:
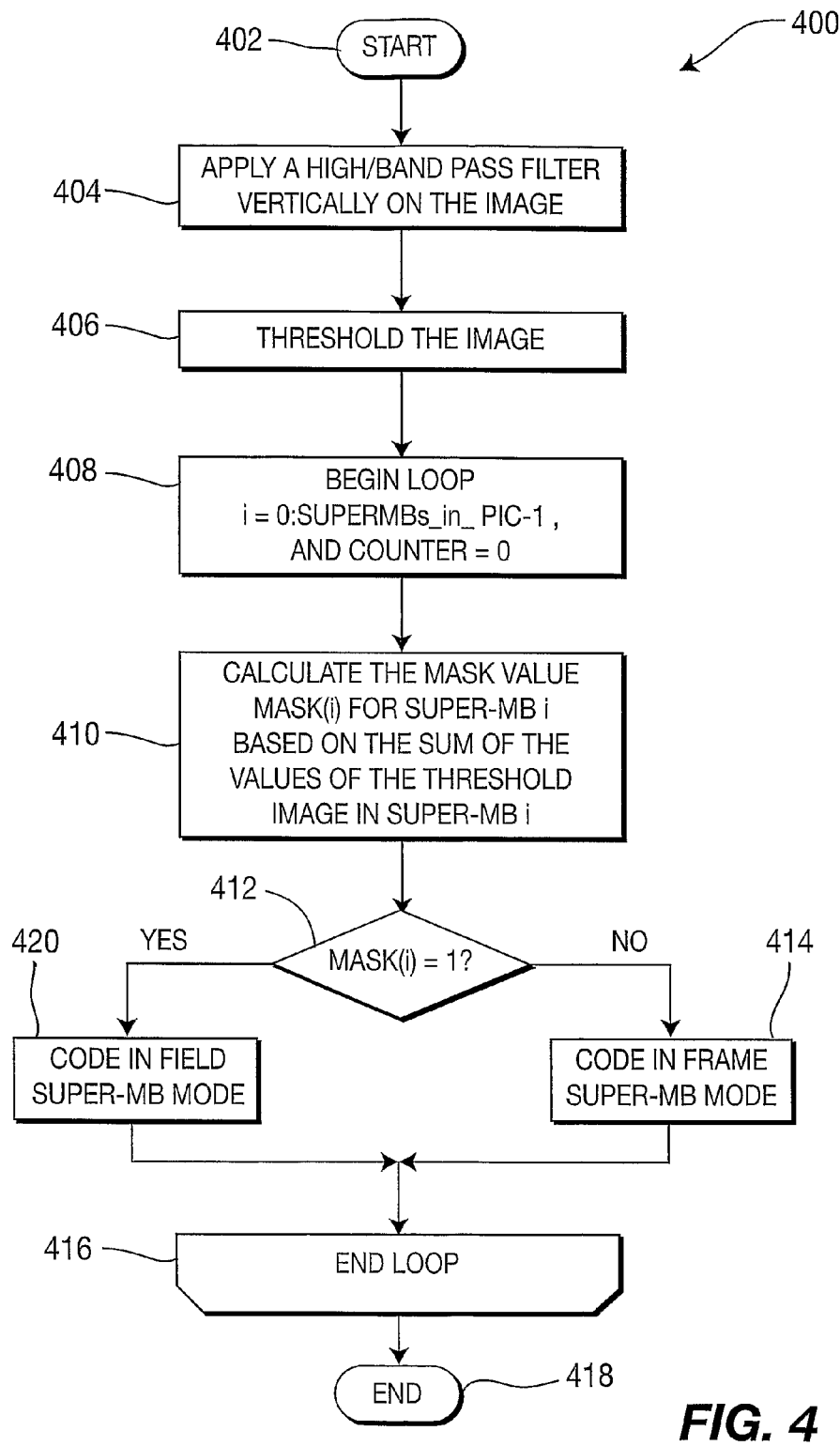
FIG. 4 shows a flow diagram for a method for performing a fast macroblock frame field coding (MBAFF) in accordance with the principles of the present invention.

Turning to FIG. 4, a method for performing a fast macroblock frame field coding (MBAFF) decision is generally indicated by the reference numeral 400. The method 400 includes a start block 402 that passes control to a function block 404. The function block 404 applies a high/band pass filter vertically on the image, and passes control to a function block 406. The function block 406 applies a threshold to the image, and passes control to a loop limit block 408. The loop limit block 408 begins a loop, loops variable i from 0 to superMBs_in_pic-1, and passes control to a function block 410. The function block 410 calculates the mask value MASK(i) for super-MB i based on the sum of the values of the threshold image in super-MB i, and passes control to a decision block 412. The decision block 412 determines whether or not the mask value MASK(i) is equal to 1. If the mask value MASK(i) is not equal to 1, then control is passed to function block 414. Otherwise, if the mask value MASK(i) is equal to 1, then control is passed to a function block 420.

The function bock 414 performs coding in frame super-MB mode, and passes control to a loop limit block 416. The loop limit block 416 ends the loop, and passes control to an end block 418.

The function block 420 performs coding in field super-MB mode, and passes control to loop limit block 416.

Figure 5:
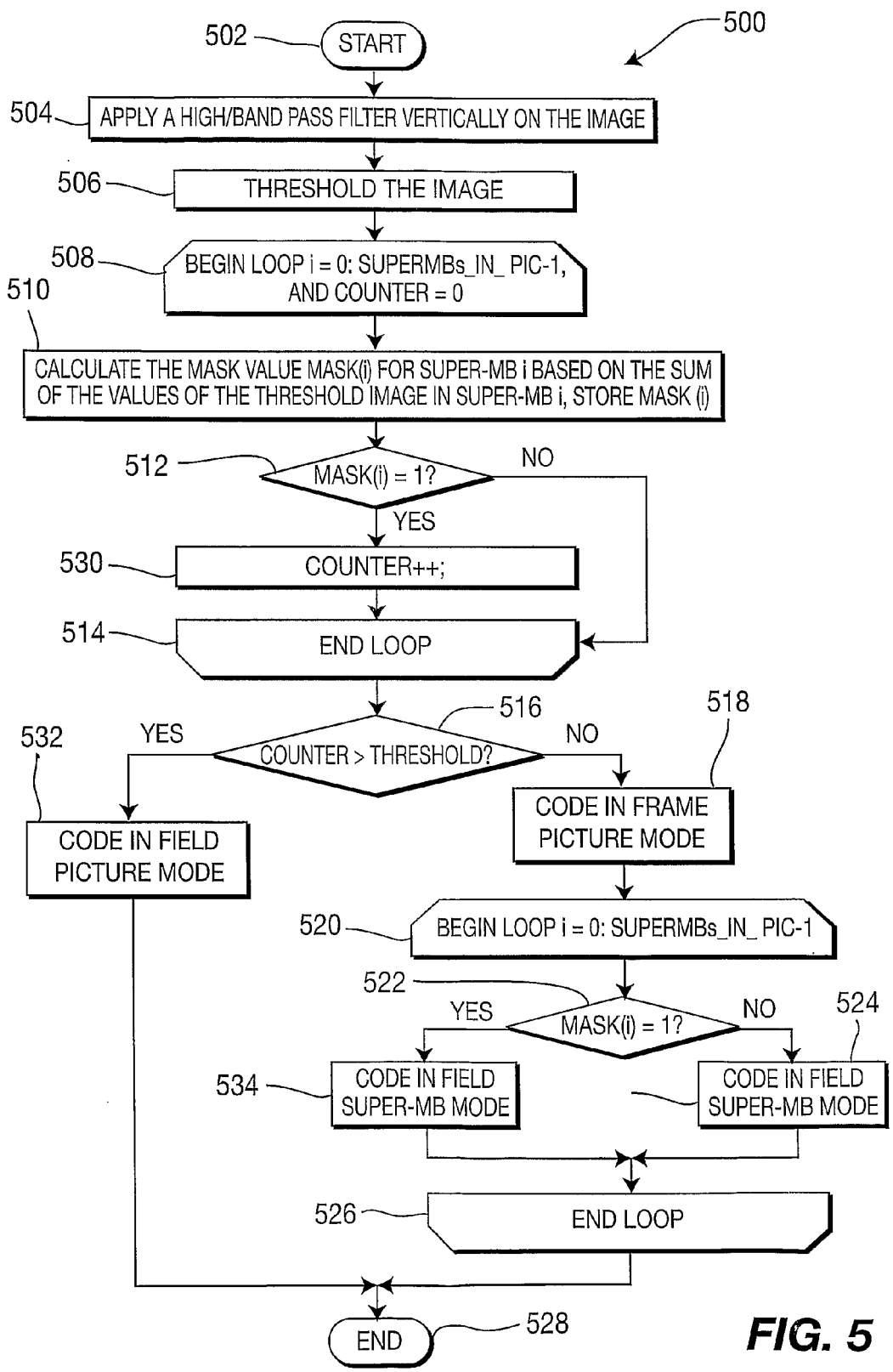
FIG. 5 shows a flow diagram for a method for performing a fast picture frame and field coding (PAFF) and fast macroblock frame field coding (MBAFF) decision in accordance with the principles of the present invention.

Turning to FIG. 5, a method for performing a fast picture frame and field coding (PAFF) and fast macroblock frame field coding (MBAFF) decision is generally indicated by the reference numeral 500. The method 500 includes a start block 502 that passes control to a function block 504. The function block 504 applies a high/band pass filter vertically on the image, and passes control to a function block 506. The function block 506 applies a threshold to the image, and passes control to a loop limit block 508. The loop limit block 508 begins a loop, loops variable i from 0 to superMBs_in_pic-1, and passes control to a function block 510. The function block 510 calculates the mask value MASK(i) for super-MB i based on the sum of the values of the threshold image in super-MB i, and passes control to a decision block 512. The decision block 512 determines whether or not the mask value MASK(i) is equal to 1. If the mask value MASK(i) is not equal to 1, then control is passed to a loop limit block 514. Otherwise, if the mask value MASK(i) is equal to 1, then control is passed to a function block 530.

The loop limit block 514 ends the loop, and passes control to a decision block 516. The decision block 516 determines whether or not the counter variable is greater than a pre-specified threshold. If the counter variable is not greater than a pre-specified threshold, then control is passed to a function bock 518. Otherwise, if the counter variable is greater than a pre-specified threshold, then control is passed to a function block 532.

The function bock 518 performs coding in frame picture mode, and passes control to a loop limit block 520. The loop limit block 520 begins a loop, loops variable i from 0 to superMBs_in_pic-1, and passes control to a decision block 522.

The decision block 522 determines whether or not the mask value MASK(i) is equal to 1 based on precomputed data in 510. If the mask value MASK(i) is not equal to 1, then control is passed to function block 524. Otherwise, if the mask value MASK(i) is equal to 1, then control is passed to a function block 534.

The function bock 524 performs coding in frame super-MB mode, and passes control to a loop limit block 526. The loop limit block 526 ends the loop, and passes control to an end block 528.

The function block 530 increments the counter by 1, and passes control to loop limit block 514. The loop limit block 514 ends the loop, and passes control to decision block 516.

The function block 532 performs coding in field picture mode, and passes control to end block 528.

The function block 534 performs coding in field super-MB mode, and passes control to loop limit block 526.

A further description will now be given regarding various aspects of the present invention previously described.

A further description will now be given regarding the band-pass filter $k_{BP}$. If the case is considered of an object moving horizontally in front of a background, then interlace artifacts (i.e. moving edges) can be observed along the object edges, since each odd field is usually captured exactly one field later than its preceding even field. By detecting these interlace artifacts, it can be determined whether or not the object is moving. It is to be appreciated that as used herein, the phrase "band-pass filter" is intended to encompass a high-pass filter and any other type of filtering capable of detecting interlace artifacts as described herein. These filters can be applied along the vertical axis of the current frame.

After applying the band-pass filter on the current frame, it is to be decided whether or not moving edges are present in an image. It is presumed that after filtering, the filtered output is $I_{BP}(x, y)$.

A further description will be now be given regarding creating a mask for a Super-MB.

A thresholded image M(x,y) is generated by taking the absolute value $I_{BP}(x, y)$ and comparing its value to a threshold $T_1$, that is:

$$M(x, y) = \begin{cases} 1 & \text{if } |I_{BP}(x, y)| > T_1 \\ 0 & \text{otherwise} \end{cases} \quad (\text{eq:1})$$

The mask for super-MB E is set as:

$$MASK(E) = \begin{cases} 1 & \text{if } \sum_{x,y \in E} M(x, y) > T_2 \\ 0 & \text{otherwise} \end{cases} \quad (\text{eq:2})$$

An alternative method to decide the mask for super-MB E is by comparing a threshold ($T_{energy}$) with respect to the sum of absolute filtered pixels, as follows:

$$MASK(E) = \begin{cases} 1 & \text{if } \sum_{x,y \in E} |I_{BP}(x, y)| > T_{energy} \\ 0 & \text{otherwise} \end{cases} \quad (\text{eq:3})$$

For the PAFF decision, a frame is coded in field mode if $$\text{hist\_edge} = \sum_{i \in B} MASK(i) > T_3,$$

otherwise the frame is coded in frame mode, where B is the set for the super-MBs. As for MBAFF decision, if MASK(E)=1, then the super-MB E is coded in field mode, otherwise, the super-MB is coded in frame mode.

Although the formulation of Equation 1 and Equation 2 appears sufficient for the detection of moving Super-MBs, it does not consider the impact during the encoding of the actual position (x,y) of a pixel within a Macroblock or block. For example, the significance of block edge pixels might be lower compared to pixels in the center of a block for such a comparison, especially due to the impact of the in-loop deblocking filter. On the other hand, significance could increase or decrease depending on the correlation between adjacent pixels. Therefore, a possible alternative for the computation of MASK(E) is:

$$M(x, y) = \begin{cases} 1 & \text{if } |a(x, y) \times I_{BP}(x, y)| > T_1 \\ 0 & \text{otherwise,} \end{cases} \quad (\text{eq:4})$$

where a(x,y) is a value that depends on the position (x,y) and the correlation of the value of $I_{BP}(.)$ at this position and its neighbors. For example for a 4×4 block:

$$a = \frac{1}{4}\begin{bmatrix} 2 & 3 & 3 & 2 \\ 3 & 4 & 4 & 3 \\ 3 & 4 & 4 & 3 \\ 2 & 3 & 3 & 2 \end{bmatrix}$$

The edge detection filter can detect both interlaced artifacts (moving edges) and true edges. To reduce the probability of false positive detection, the threshold $T_1$ in (eq:1) is adaptively selected based on the characteristics of the first field (presumed to be the top field) in the frame. The same filter $K_{BP}$ is applied vertically on this field. A threshold is selected where the ratio of edges in this field is less than $T_4$, i.e., $$\Sigma M(x,y) < T_4 * W * H/2 \quad (\text{eq:5}),$$

where W is the width of the frame, and H is the height of the frame. The threshold can be decided on a frame basis, Group of Picture (GOP) basis, or scene basis. As used herein, the term "GOP" refers to an I picture followed by P and B pictures. Moreover, as used herein, the phrase "scene basis" refers to the pictures in-between scene changes. Other thresholds can be decided empirically. One example is to set $T_2=0$, $T_3=0.5$, and $T_4=0.1$. Of course, the present invention is not limited to the preceding values and, thus, other values may also be employed while maintaining the scope of the present invention.

The above decision can be jointly applied with other criteria, such as the mean of absolute difference between the current frame and its previous reference frame (named as avgdiff), or frame type (named as image_type), or macroblock characteristics (e.g., flat, edged, or textured), frame or MB variance, while these metrics could also allow the automatic adaptation of the necessary thresholds. One example of PAFF decision could be, e.g.,

```
if (image_type == I_SLICE)
{
   if (hist_edge <0.5)
      Code as frame mode;
   else
      Code as field mode;
}
else if (image_type == B_SLICE)
{
   if (hist_edge <0.6)
      Code as frame mode;
   else
      Code as field mode;
}
else   //P_slice
{
   if                                           ((hist_edge
>0.5)||(hist_edge>0.3)&&(avgdiff>4.5)&&(avgdiff<10.0))
      Code as field mode;
   else
      Code as frame mode;
}
```

The present invention can also be easily adapted for group of pictures (GOP) level frame/field decision. For example, the PAFF decision described herein can be applied to all the frames in the current GOP. If the number of frames to be coded in field mode is larger than a certain percentage, then only field mode coding may be used for the entire GOP, otherwise frame mode is used.

A description will now be given of some of the many attendant advantages/features of the present invention. For example, one advantage/feature is an encoder that performs, e.g., in a pre-analysis stage, picture-level adaptive frame or field decision (PAFF) using a vertical band-pass filter. PAFF decision is performed based on the percentage of Super-MBs' classified as moving regions in the image. Another advantage/feature is an encoder as described above, wherein the band-pass filter is an edge detection filter. Yet another advantage/feature is an encoder as described above, wherein the band-pass filter uses an adaptive threshold that is selected to differ moving edges from true edges, and where the threshold can be adapted frame-wise, GOP-wise, or scene-wise. Still another advantage/feature is an encoder with adaptive threshold as described above, wherein the band-pass filter is also applied to one field image and the adaptive threshold is selected where the number of edge pixels in the field image is lower than another threshold. Also, another advantage/feature is an encoder with adaptive threshold and other threshold as described above, wherein edge pixels are first weighted according to position within the block or/and correlation with neighboring pixels prior to thresholding. Moreover, another advantage/feature is an encoder as described above, wherein the mode decision is combined with other criteria, such as frame type, absolute difference of current picture and previous reference pictures, macroblock characteristics (flat, edged, or textured), frame and/or MB variance. Further, another advantage/feature is an encoder as described above, wherein the mode decision is performed at the group of pictures level, where first PAFF decision as described above is performed for all frames in current GOP such that if the number of frames decided to be coded in field mode is larger than certain percentage, then field mode is used for the entire GOP. Otherwise, frame mode is used. Yet another advantage/feature is an encoder that classifies a super-MB as frame or field using a band-pass filter. Still another advantage/feature is an encoder that performs classification as described above, wherein a MBAFF decision is based on the band-pass filter result. Also, another advantage/feature is an encoder that performs classification as described above, wherein a threshold is applied to each pixel in the Super-MB to classify as an edge pixel, and then the number of edge pixels is summed and compared to a threshold to determine if the MB is field or frame. Moreover, another advantage/feature is an encoder that performs classification as described above, wherein the sum of the absolute values of the filtered pixels are added and compared to a threshold to determine if the MB is classified as field or frame. Further, another advantage/feature is an encoder where a pre-analysis decision to classify an individual Super-MB as field or frame is used for both the PAFF and MBAFF mode selection.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. An apparatus for encoding video data for an image that is divisible into macroblocks and in which a plurality of macroblocks are assignable as a group of macroblocks, comprising:
   a motion activity detector for receiving the image as a whole image; and
   an encoder for assigning the group of macroblocks for encoding in one of a frame mode or a field mode responsive to application of the image to the motion activity detector,
   wherein said group of macroblocks is a super-macroblock (super-MB), and
   wherein the motion activity detector determines whether to encode in the frame mode or the field mode based on a percentage of super-MBs classified as moving regions in the image.

2. The apparatus according to claim 1 wherein the motion activity detector is a bandpass/high-pass filter.

3. The apparatus according to claim 2, wherein a macroblock adaptive frame field (MBAFF) decision is responsive to application of the band-pass/high-pass filter to the image.

4. The apparatus according to claim 2, wherein the super-MB comprises a plurality of pixels, and said encoder classifies at least some of the plurality of pixels as an edge pixel using an adaptive threshold for the band-pass/high-pass filter, determines a sum by adding a number of edge pixels, and compares the sum to another pre-specified threshold to determine whether the super-MB is classified with respect to the frame mode or the field mode.

5. An apparatus for encoding video data for an image that is divisible into super-macroblocks (super-MBs), comprising:
   an encoder for performing a picture adaptive frame field (PAFF) decision using a band-pass/high-pass filter applied vertically to the super-MBs to respectively classify ones of the super-MBs as a moving region or a non-moving region in the image,
   wherein the PAFF decision is based on a percentage of super-MBs classified as moving regions in the image.

6. The apparatus according to claim 5, wherein the band-pass/high-pass filter uses an adaptable threshold that is selected to distinguish moving edges from true edges.

7. The apparatus according to claim 5, wherein the PAFF decision is combined with other criteria comprising at least one selected from the group of frame type, absolute difference of a current picture and previous reference pictures, macroblock characteristics, frame variance, and macroblock variance.

8. The apparatus according to claim 5, wherein the PAFF decision is performed on a Group Of Pictures (GOPs) level, for all frames in a current GOP, such that the field mode is used for the current GOP when a number of frames decided to be coded in the field mode is larger than a pre-specified percentage, otherwise the frame mode is used for the current GOP.

9. The apparatus according to claim 6, wherein the threshold is adaptable frame-wise, Group Of Picture (GOP)-wise, or scene-wise.

10. The apparatus according to claim 6, wherein the band-pass/high-pass filter is applied to one field image, and the adaptable threshold is selected where a number of edge pixels in the one field image is lower than another threshold.

11. The apparatus according to claim 9, wherein said encoder is further used for attributing weights to the edge pixels according to at least one of position within a Super-MB and correlation with neighboring pixels prior to thresholding.

12. A video encoder for encoding video data for an image that is divisible into super-macroblocks (super-MBs), comprising an encoder for utilizing a pre-analysis decision of whether to classify an individual super-MB in the image with respect to a field mode or a frame mode, for both a picture adaptive frame field (PAFF) mode selection and a macroblock adaptive frame field (MBAFF) mode selection,
   wherein the decision of whether to classify the individual super-MB in field mode or frame mode is based on exceeding a motion percentage threshold for the super-MB.

13. A method for encoding video data for an image that is divisible into macroblocks and in which a plurality of the macroblocks are assignable as a group of macroblocks, comprising:
   detecting motion beyond a threshold for sections of the group of macroblocks; and
   assigning the group of macroblocks for encoding in one of a frame mode or a field mode responsive to whether motion beyond the threshold is detected in the detecting step,
   wherein said group of macroblocks is a super-macroblock (super-MB), and
   wherein the assigning step determines whether to encode in the frame mode or the field mode based on a percentage of super-MBs classified as moving regions in the image.

14. A method for encoding video data for an image, comprising the step of classifying a super-macroblock (super-MB) in the image with respect to one of a frame mode or a field mode using a band-pass/high-pass filter applied vertically to the image,
   wherein the step of classifying the super-MB in frame mode or field mode is based on exceeding a motion percentage threshold for the super-MB.

15. The method according to claim 14, further comprising the step of utilizing a classification obtained by the band-pass/high-pass filter for a macroblock adaptive frame field (MBAFF) decision.

16. The method according to claim 14, wherein the super-MB comprises a plurality of pixels, and said classifying step comprises the steps of:
   classifying at least some of the plurality of pixels as an edge pixel using an adaptive threshold for the band-pass/high-pass filter;
   determining a sum by adding a number of edge pixels; and
   comparing the sum to another pre-specified threshold to determine whether the super-MB is classified with respect to the frame mode or the field mode.

17. A method for encoding video data for an image that is divisible into super-macroblocks (super-MBs), comprising:
   performing a picture adaptive frame field (PAFF) decision using a band-pass/high-pass filter applied vertically to the super-MBs to respectively classify each of the super-MBs as a moving region or a non-moving region in the image, and wherein the PAFF decision is based on a percentage of super-MBs classified as moving regions in the image.

18. The method according to claim 17, wherein the band-pass/high-pass filter is an edge detection filter.

19. The method according to claim 17, wherein the band-pass/high-pass filter uses an adaptable threshold that is selected to distinguish moving edges from true edges.

20. The method according to claim 17, wherein the PAFF decision is combined with other criteria comprising at least one of frame type, absolute difference of a current picture and previous reference pictures, macroblock characteristics, frame variance, and macroblock variance.

21. The method according to claim 17, wherein the PAFF decision is performed at a Group Of Pictures (GOPs) level, for all frames in a current GOP, such that the field mode is used for the current GOP when a number of frames decided to be coded in the field mode is larger than a pre-specified percentage, otherwise the frame mode is used for the current GOP.

22. The method according to claim 19, wherein the threshold is adaptable frame-wise, Group Of Picture (GOP)-wise, or scene-wise.

23. The method according to claim 19, wherein the band-pass/high-pass filter is applied to one field image, and the adaptable threshold is selected where a number of edge pixels in the one field image is lower than another threshold.

24. The method according to claim 22, wherein the method further comprises the step of attributing weights to the edge pixels according to at least one of position within a Super-MB and correlation with neighboring pixels prior to thresholding.

25. A method for encoding video data for an image, comprising the step of utilizing a pre-analysis decision whether to classify an individual super-macroblock (super-MB) in the image with respect to a field mode or a frame mode for both a picture adaptive frame field (PAFF) mode selection and a macroblock adaptive frame field (MBAFF) mode selection, wherein the pre-analysis decision whether to classify an individual super-MB in field mode or frame mode is determined responsive to exceeding a motion percentage threshold for the super-MB.

* * * * *